March 14, 1933.                D. S. MARSHALL                1,901,038
                                ELECTRIC HEATER
                              Filed Oct. 23, 1929

INVENTOR.
DAVID S. MARSHALL
BY
   A.B.Bowman
        ATTORNEY

Patented Mar. 14, 1933

1,901,038

UNITED STATES PATENT OFFICE

DAVID S. MARSHALL, OF SAN DIEGO, CALIFORNIA

ELECTRIC HEATER

Application filed October 23, 1929. Serial No. 401,676.

My invention relates to electric heaters, and the objects of my invention are: First, to provide a heater which produces a circulation of air throughout the room by drawing in the colder air from the floor and directing the worm air upwardly; second, to provide a heater of this class which may resemble a vase, urn or jardinière, and may, therefore, harmonize with the other furniture in the room, thereby eliminating the unsightliness of the conventional heater; third, to provide a heater of this class in which the air passing therethrough is purified by raising its temperature to a point at which oxidation of deleterious particles centered in the air takes place; fourth, to provide a heater of this class which is formed of material that does not readily conduct heat, and thereby does not, in ordinary use, become hot enough to cause serious injury should one come in contact with it; fifth, to provide a heater of this class in which the heating element is entirely concealed and protected; and sixth, to provide on a whole, a novelty constructed electric heater which is particularly simple of construction proportional to its functions, economical of manufacture, durable, efficient in its action, and which will not readily deteriorate or get out of order.

Figure 2:
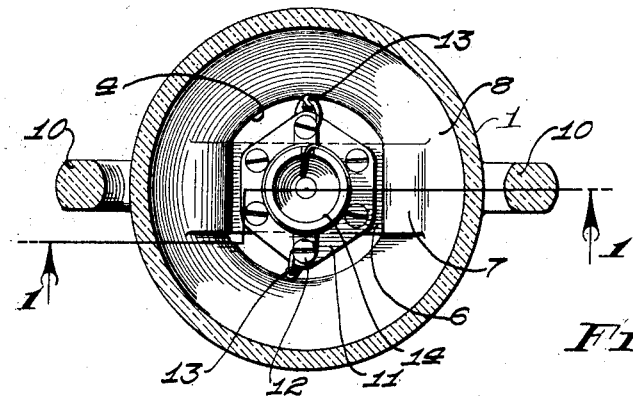
Figure 1:
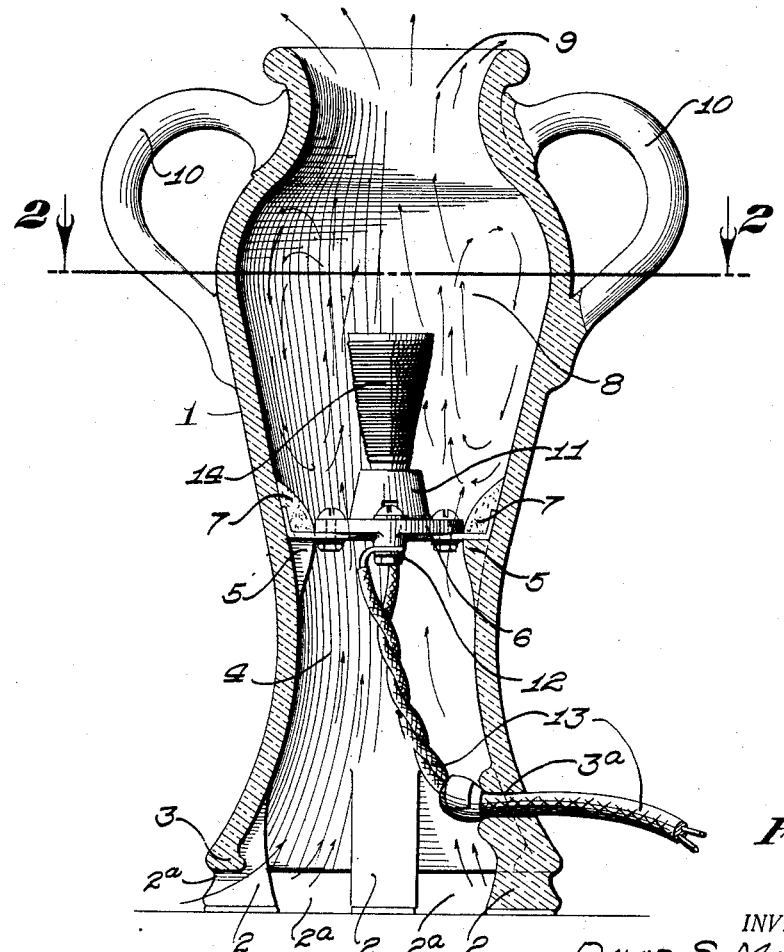

With these and other objects in view as will appear hereinafter, my invention consists of certain novel features of construction, combination and arrangement of parts and portions as will be hereinafter described in detail and particularly set forth in the appended claims, refernce being had to the accompanying drawing and to the characters of reference thereon, which form a part of this application, in which:

Figure 1 is a longitudinal sectional view substantially through 1—1 of Fig. 2, with parts and portions shown in elevation to facilitate the illustration; and Fig. 2 is a transverse sectional view through 2—2 of Fig. 1.

Similar characters of reference refer to similar parts and portions throughout the several views of the drawing.

The heater includes a shell 1, which resembles a vase, urn or jardinière not only in its appearance, but in its materials of composition, said shell being formed of pottery clay or the like. The bottom or base 3 of the shell 1 is spaced from the floor by several foot portions 2. The base 3 of the heater is preferably flared outwardly so as to form a firm support. Above the base 3, the shell 1 is constricted, forming a throat portion 4.

At the upper portion of the throat portion, the shell 1 is provided with a pair of diametrically disposed, inwardly extending boss portions 5, upon which rests the end of a bridge 6. The bridge 6 is secured to the boss portions 5 by cement or other suitable plastic material 7, which is formed over the ends of the bridge 6, as shown in Fig. 1.

Above the boss portions 5, the shell 1 flares outwardly, forming a heating chamber 8. Above the heating chamber 8, the shell is again constricted, forming a mouth 9.

Secured to the outer side of the shell 1 is a pair of handles 10, the upper ends of which join the shell 1 at the outer side of the mouth portion 9 while the other or lower ends of the handles 10 join the shell opposite the heating chamber portion 8. As the material of which the shell is composed is a relatively poor heat conductor, the handles 10, which are formed of the same material, remain comparatively cool even though the heater is used for a long period of time.

Supported upon the bridge 6 is a socket member 11, which is provided with electric terminal means 12, to which are secured two electric wires 13. The wires 13 extend downwardly out through a hole provided in one side wall 3a of the flared portion 3, and are connected to a suitable source of electric current.

Mounted in the socket 7 is an electric heating element 14, which is approximately centered relative to the longitudinal axis of the shell 1.

Cool air enters in the spaces 2a formed between the foot portions 2, and passes upwardly to the throat 4, and around the socket member 11. The relative size of the jardinière and heating element 14 is such that the air must pass relatively close to the heating element, and thereby be heated to a point at which oxidation of deleterious matter in the air readily takes place.

Due to the constriction of the mouth portion 9, there is a tendency for convection currents to set up in the heating chamber 8 so that the flow of air therein is relatively slow, and thereby the air has sufficient time to be properly heated before issuing from the mouth 9.

It is obvious from the construction as illustrated in the drawing and described in the foregoing specification that there is provided an electric heater as aimed at and set forth in the objects of the invention; and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an electric heater, an open-ended shell comprising a lower constricted portion adjacent its lower extremity, an upper constricted portion adjacent the upper extremity of said shell, and a belled or enlarged portion intermediate said constricted portions, the walls thereof diverging gradually from said lower constricted portion and converging abruptly into said upper constricted portion, a conical heating element disposed within said enlarged portion with its sides diverging upwardly in substantially parallel relation with the diverging walls of said enlarged portion, whereby air passing upwardly from said lower constricted portion is deflected towards the abruptly converging walls of said enlarged portion and thereby caused to set up convection currents so that the air particles are warmed repeatedly before passing out of said upper constricted portion.

2. In an electric heater, an open-ended shell, its side walls diverging gradually intermediate its ends then converging abruptly adjacent its upper portion forming therein a heating chamber, a support bridging said heating chamber at the lower portion thereof, a frusto-conical, unenclosed electrical heating element mounted upon said support, the walls of said heating element diverging upwardly and disposed opposite the diverging walls of said heating chamber, said support forming a restriction for controlling the flow of air upwardly through said shell whereby the air upon passing into said heating chamber is retarded and free to form convection currents so that the air particles have opportunity to contact with said heating element and become sterilized by reason of the localized high heat.

In testimony whereof, I have hereunto set my hand at San Diego, California this 18th day of October, 1929.

DAVID S. MARSHALL.